United States Patent [19]
Goscenski, Jr.

[11] 3,811,341
[45] May 21, 1974

[54] DIFFERENTIAL GEAR MECHANISM
[75] Inventor: Edward J. Goscenski, Jr., Battle Creek, Mich.
[73] Assignee: Eaton Corporation, Cleveland, Ohio
[22] Filed: Nov. 8, 1972
[21] Appl. No.: 304,617

[52] U.S. Cl. .............................. 74/711
[51] Int. Cl. ............................. F16h 1/44
[58] Field of Search ................. 74/710, 711

[56] References Cited
UNITED STATES PATENTS
3,534,633   10/1970   Chocholek ............................ 74/711
3,572,165   3/1971   Roper .................................... 74/711
3,517,573   6/1970   Roper .................................... 74/711

Primary Examiner—Leonard H. Gerin
Attorney, Agent, or Firm—Teagno & Toddy

[57] ABSTRACT

A locking differential mechanism comprises a differential gear means including an input gear and a pair of output gears. A locking mechanism locks up the differential in response to a predetermined amount of differentiating action occurring. The locking mechanism functions to lock one of the output gears to the case of the differential. The actuator for actuating the locking mechanism to effect the lockup comprises an oscillating weight actuator mechanism.

13 Claims, 5 Drawing Figures

DIFFERENTIAL GEAR MECHANISM

BACKGROUND OF THE INVENTION

The present invention relates to a locking-type differential gear mechanism, and in particular relates to an actuator mechanism for actuating the lockup of a differential mechanism.

Locking differential mechanisms are well known. Such differentials are known to be used as interaxle differentials such as in a four-wheel drive, as well as interwheel differentials interposed between the wheels on a common axle. The locking-type of differential mechanisms which are knwon in the art normally include a mechanism for locking two rotatable parts of the differential together. The specific locking mechanism may, and has in the art, taken many different forms and generally is a clutch mechanism, such as a disc pack, cone clutch, etc. The known locking-type differential mechanisms also include an actuator or engagement mechanism for actuating the locking mechanism (clutch) to effect the lockup of the two differential parts.

Ottemann U.S. Pat. No. 3,606,803 discloses a typical known locking-type differential in which the side gear of the differential is locked through a suitable clutch mechanism to the case of the differential upon a predetermined degree of differential action. When the differentiating action reaches a predetermined degree, an actuator mechanism is operated which actuates the clutch mechanism to effect the lockup, and specifically lock the side gear of the differential to the differential casing. In U.S. Pat. No. 3,606,803, for example, the clutch mechanism is actuated upon relative rotation of the side gear and a cam member. The cam member is retarded from rotation with the side gear by operation of the actuating mechanism for the differential. The acuator mechanism comprises a series of weights which are thrown out upon a predetermined amount of differential action occurring and when thrown out are latched from rotating, and accordingly effect a retarding action on the cam member which in turn results in the side gear rotating relative to the cam, which then actuates the clutch mechanism for locking the side gear to the case of the differential. In the Ottoman U.S. Pat. No. 3,606,803, the actuator mechanism is mounted on the differential case and may be actuated to cause engagement of the clutch to lock the differential due to case centrifugal force as opposed to merely differentiating action occurring. Also, the actuator mechanism, which includes weights, which are thrown out and then latched, is subject to the problem of the possibility of the weights missing and not being latched. In addition, such actuator mechanisms are somewhat complicated and involve a number of parts, and therefore are not as reliable as may be possible.

SUMMARY OF THE PRESENT INVENTION

The present invention is directed to an improvement in the actuator for a locking-type differential, which actuator effects the actuation of the lockup mechanism or clutch. The actuator mechanism embodying the present invention is simpler and is believed to be more economical to produce than those of the known prior art. Also, it is believed to be much more reliable, since the actuator is not subjected to the problem of chance is missing actuation as in the structure disclosed in the afore-mentioned Ottemann patent. Moreover, the actuator of the present invention is not subjected to the problem of possible engagement due to case centrifugal force, even though no differentiating action is occurring.

More specifically, the present invention provides an actuator mechanism which applies a retarding force to a cam member which actuates the lockup mechanism for the differential. During normal operation, the cam mechanism rotates along with the side gear for driving one of the outputs of the differential. When there is a sufficient amount of differentiating action indicating a wheel-slip condition, the side gear rotates relative to the cam member a sufficient distance so that a camming force between the side gear and cam member results in axial movement of the cam member relative to the side gear to effect actuation of the lockup mechanism, which in the present embodiment is disclosed as a disc pack which acts between the cam mechanism or side gear and the case of the differential. The actuator mechanism of the present invention provides a retarding force on the cam member so that the cam member is restricted from rotating with the side gear upon differential action occurring.

The actuator member of the present embodiment specifically consists of a member which oscillates and is carried by the case of the differential and cooperates with teeth on the cam member. The ocillating member is carried or formed as part of a weight and as the cam member tends to rotate at a higher speed with respect to the case, the weight retards the rotation of the cam member with respect to the case, and as a result the cam member is restrained from rotating with the side gear when differential action is occurring. This retarding force applied by the weight to the cam member, when reaching a predetermined magnitude, results in the side gear rotating relative to the cam member. Because of the cooperative engagement between the side gear and cam member, the relative rotation of the side gear and cam member results in axial movement of the cam member causing an actuation of the locking mechanism for locking the side gear and case together.

The oscillating weight is a structure which acts in intimate and direct contact with the cam member to retard rotation thereof, and thus is a very simple structure and very economical to manufacture. In addition, the oscillating weight mechanism is not subject to effecting an actuation of the lockup mechanism, due merely to case centrifugal force and when no differentiating action is occurring. Moreover, since the weight operates in very intimate and close contact with the cam member, there is a minimum possibility of a failure of actuation at the desired level of differentiation.

DESCRIPTION OF THE DRAWINGS

Further objects and advantages of the present invention will be apparent to those skilled in the art to which it relates from the following detailed description of a preferred embodiment thereof made with reference to the accompanying drawings in which.

DESCRIPTION OF PREFERRED EMBODIMENTS

The present invention provides an improved differential mechanism, and particularly an improved locking actuator mechanism for a locking-type of differential mechanism. As noted hereinabove, locking differentials are used as limited slip differentials between wheels of a vehicle and which function when one wheel of the vehicle slips to transmit the torque to the non-slipping wheel of the vehicle. Such differential are also usable inter axle in four-wheel drive vehicles. In such an environment, the differential operates, in the event that a wheel on one axle is slipping, to transmit the torque to the nonslipping wheels on the other axle. The embodiment of the invention, disclosed in FIG. 1 and generally designated 10, comprises a differential mechanism which is utilized as an inter-axle differential in a four-wheel drive vehicle.

Figure 1:
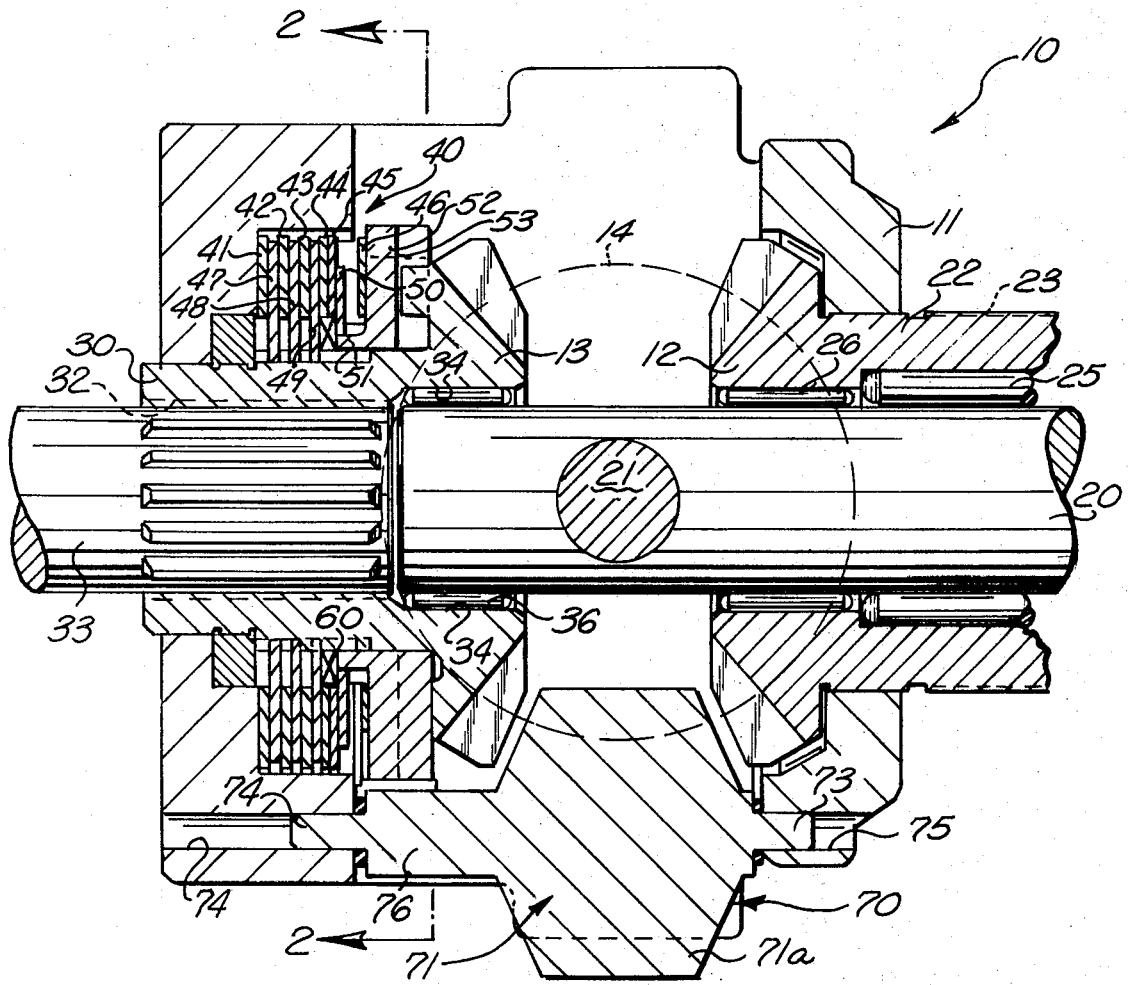
FIG. 1 is a sectional view of a locking-type differential embodying the present invention.

The differential mechanism 10 which is illustrated in FIG. 1 includes a differential case or housing 11, a pair of side gears 12, 13, and pinions, one of which is designated 14 and shown schematically in FIG. 1. The pinions 14, of course, mesh with the sides gears 12, 13 and are also located in the case 11.

The input drive to the differential mechanism 10 is through a shaft 20 which is drivingly connected with the transmission of the vehicle. The shaft 20 projects into the case 11 and on its inner end has a cross shaft or stub shaft 21 thereon, which extends transversely of the shaft 20 and on which the pinions 14 are rotatably mounted. The shaft 21 extends (not shown) into the case 11 and upon rotation of the shaft 20, the case 11 and pinions 14 are rotated therewith about the axis of the shaft 20.

As the pinions 14 are rotated, torque is transmitted thereby to the side gears 12, 13 through the meshing gear teeth of the pinions 14 and side gears 12 and 13. The side gear 12 has a hub portion 22 which is splined at 23. The splined portion 23 is provided for connection to a suitable drive member such as a gear or sprocket, which in turn is drivingly connected in a suitable manner to drive the front wheels of the vehicle. The side gear 12 has a central opening therethrough and is supported by the shaft 20 which extends through the opening in the side gear and into the case. Suitable needle bearings designated 25 and 26 encircle the shaft 20 and support the side gear 12 thereon for rotation relative thereto.

The side gear 13 also has a hub portion designated 30 in FIG. 1. The hub portion 30 of the side gear 13 is internally splined at 32 and is drivingly connected with a splined shaft 33. The shaft 33 extends to the rear wheels of the vehicle and constitutes the input drive shaft for the rear wheels of the vehicle. The side gear 13 also has at its forward end, a counterbored opening 34 therein. The drive shaft 20 extends into the counterbored opening 34 in the side gear 13 and a suitable bearing 36 is interposed between the counterbored opening 34 of the side gear 13 and the shaft 20 to provide for relative rotation between the side gear 13 and the shaft 20.

From the above, it should be apparent that upon engagement of the transmission of the vehicle, the drive shaft 20 drives pinions 14 therewith as well as the case 11, and the pinions 14, due to their meshing engagement with side gears 12 and 13, transmit the drive to the side gears 12, 13, which in turn effect the driving of the front and rear wheels, respectively, of the vehicle.

As noted above, the differential 10 which embodies the present invention is a locking-type differential which functions to transmit the torque to one of the side gears 12 or 13 if the other of the side gears begins spinning at too high a rate. To this end, the differential 10, includes a locking mechanism for effecting a locking of the side gear 13 to the differential case 11. The locking mechanism is generally designated 40, as shown in FIG. 1.

The locking mechanism 40 may take a variety of different constructions. In the embodiment of FIG. 1, the locking mechanism 40 comprises a disc pack. The disc pack includes a plurality of discs which are designated 41 to 46 and all of which are keyed to the housing 11 and rotate therewith. The disc pack also includes a plurality of discs 47, 48 and 49 which are interposed between certain of the discs 41 to 46, as shown in the drawings, and which are keyed to the side gear 13. The disc pack further includes one disc which is interposed between the discs 45 and 46 and which is designated 50. The disc 50 is keyed to the hub portion 51 of a cam member 52 which is interposed between the side gear 13 and the disc pack, and which will be described in detail hereinbelow. It should be obvious, however, that if the disc pack is actuated in order to establish a frictional engagement between the various discs, the frictional engagement will cause a transmission of torque from the case 11 directly to the side gear 13, thereby locking the side gear 13 and case together.

Figure 3:
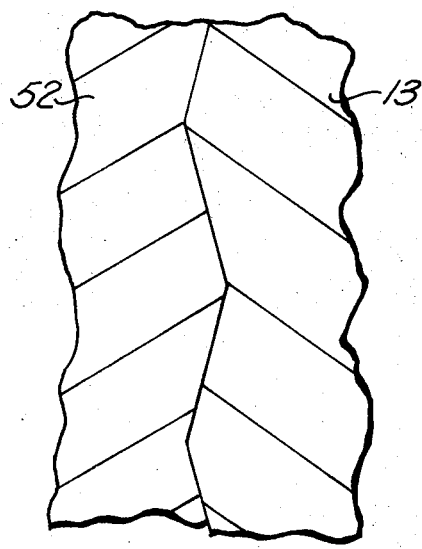
FIGS. 3 and 4 are somewhat schematically enlarged views illustrating portions of the mechanism shown in FIG. 1 in two different operative positions.
Figure 4:
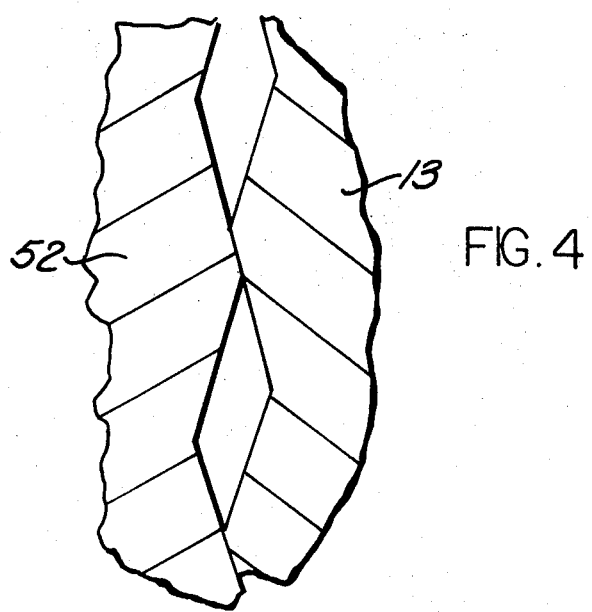

The mechanism or disc pack 40, as noted hereinabove, functions to lock the case 11 to the side gear 13 so as to retard or prevent differentiating action when so actuated. The mechanism 40 is actuated by axial loading of the disc pack in response to a predetermined level of differentiating action occurring. This axial loading is effected by the cam 52 which moves axially of the side gear 13 to load the disc pack 40 when the differentiating action achieves a predetermined level. The axial movement of the cam 52 is effected by cam teeth which are formed on the side thereof, generally designated 53, and cooperating cam teeth on the adjacent side of the side gear 13. These teeth or cam surfaces are better shown in an enlarged view in FIG. 3. When the cam 52 and side gear 13 are in their predetermined or desired position and normal differentiating action is occurring, the gear 13 and cam 52 have their co-operating cam surfaces in the position illustrated in FIG. 3, where the teeth or cam surfaces on the gear 13 and cam 52 are in a cooperating meshing engagement. In the event, however, that the cam 52 and gear 13 rotate relative to each other, the cam surfaces are shifted to a position such as shown in FIG. 4. In this position, the cam 52 is moved or cammed axially of the gear 13 by the cooperating cam teeth. The axial movement of the cam 52 causes an axial loading of the disc pack or locking mechanism 40 so as to effect a locking of the differential so as to retard differential action.

When the cam 52 moves axially, it moves in opposition to a small wave spring 60 which is interposed between the one axial end of the hub portion of the cam 52 and the disc pack 40. The wave spring 60, of course, will return the cam 52 to the normal engaged position, as shown in FIG. 3, with the side gear 13 when the force holding the cam 52 is removed.

As shown in the drawings, the disc pack 40, and particularly the portion of the disc pack 40 between the disc 50 and 46 is provided with a substantial space therebetween. This space which is shown at that location is merely for purposes of illustration, since that space may be distributed between the various discs in the disc pack rather than being in one specific location. It is shown in the drawings in this way in order to show that there is a certain amount of axial movement necessary for the cam 52 to effect a loading of the disc pack 40 and that prior to that movement, the disc pack 40 is not axially loaded but rather the discs are relatively free to rotate with respect to each other.

From the above it should be apparent that upon relative rotation of the side gear 13 and the cam 52, the cam 52 is moved axially to actuate the locking mechanism 40 for locking up the differential. In accordance with the present embodiment of the invention, a suitable mechanism is provided to provide for relative rotation of the side gear 13 and cam 52 when a predetermined amount of differentiation occurs. When the amount of differentiation is below that predetermined amount, the cam 52 and gear 13 are not actuated to effect axial loading of the locking mechanism 40. Above that predetermined amount of relative rotation, the locking mechanism 40 is actuated to lock up the differential.

In accordance with the present invention, an improved actuator mechanism is provided and generally designated 70 and which actuator mechanism functions to actuate the locking mechanism 40 and specifically functions to provide for the relative rotation of the cam 52 and side gear 13 so as to effect the axial loading of the disc pack and the locking up of the differential.

Figure 2:
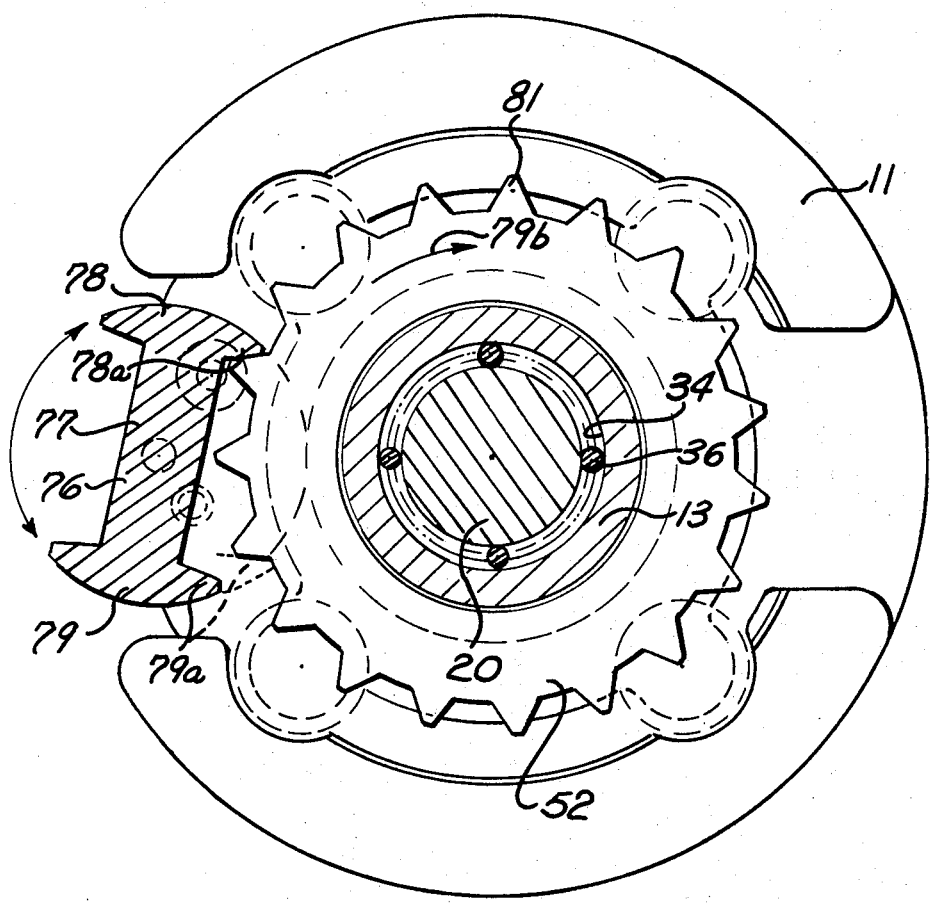
FIG. 2 is a schematic sectional view taken approximately along the line 2—2 of FIG. 1.

The acutator mechanism 70 embodying the present invention is an extremely simple reliable mechanism and, in essence, comprises a weight member 71 which is carried for pivotal rotation in the case 11. Specifically, the weight member 71 has stub shaft portions 72 and 73 projecting from the opposite ends thereof and which project into suitable openings 74 and 75, respectively, in the casing 11 and are supported for rotation therein. The weight member 71 also has a portion 76 which is located intermediate the stub shaft portion 72 and the main body or main portion 71a of the weight member. This intermediate portion 76 of the weight member 71 is best shown in FIG. 2 in cross-sectional view. The portion 76 is in the general shape of the letter "I" and includes a main portion 77, and at the opposite ends of the main portion 77 toothed or cap portions 78 and 79 project therefrom. The portion 78 has a projecting tooth portion 78a thereon and the portion 79 also has a projecting tooth portion 79a, both of which project toward the side gear 13 and the cam 52. The portion 76, and particularly the projecting tooth portions 78a and 79a, lie in a plane containing the cam 52. The outer periphery of the cam 52 has a plurality of teeth 81 which project therefrom and which, of course, rotate with the cam 52. The tooth portions 78a, 79a alternately are located in the path of rotation of the teeth 81, as will be described below.

The operation of the actuator mechanism 70 is such that the weight 71 and the portion 76 osciallates during operation of the differential and provides through the teeth 78a and 79a a retarding force which retards rotation of the cam member 52 with the side gear 13. This retarding action is due to the fact that the oscillating mass 71 must, in order to be moved thereby, be accelerated by the teeth 81 on the cam member 52. For example, as the mass 71 moves in a clockwise direction about the axis of stub shafts 72, 73, as viewed in FIG. 2, to the position of the mass as shown in FIG. 2, the tooth 78a moves into and engages a tooth 81 on the cam member 52. Assuming differential action occurring in a direction so that the cam 52 is rotating in the direction of arrow 79, a tooth 81 on the cam member 52 stops the clockwise movement of the weight and reverses that movement of the weight in order to rotate past the tooth 78a on the weight. The engagement of the tooth 81 with the projection or tooth 78a on the weight results in the tooth 81 forcing or changing the direction of the mass 70 to a counterclockwise direction of rotation. This reversal of the direction of movement of the mass results, of course, in an acceleration of the mass in a counterclockwise direction, as viewed in FIG. 2. This required a certain amount of force to be applied to the mass 70 which results in a reaction force being applied to the cam member 52 which retards the rotation of the cam member 52 with the gear 13.

When the weight moves in the opposite direction, namely, in a counterclockwise direction into the dashed position illustrated in FIG. 2, the projection or tooth 79a comes into engagement with another tooth 81 on the cam member 52. This engagement of the tooth 79a with another tooth 81 on the cam member 52 results in the weight being stopped in its counterclockwise direction of rotation, as viewed in FIG. 2, and then accelerated in a clockwise direction of rotation. Again, the mass 70 is stopped in its direction of rotation and must be accelerated in the opposite direction. This action again is effected by the teeth on the cam member 52 and again results in a retarding force, retarding the rotation of the cam 52. As the cam 52 rotates with the side gear 13 at a greater and greater rate of speed which occurs when greater and greater differentiating action occurs, the cam member 52 then rotates at a more rapid rate with the gear 13. As the cam member 52 rotates at a more rapid rate, the retarding force applied to the cam member 52 by the weight 71 increases until the cam member 52 can not follow or rotate along with side gear 13. As a result, the side gear 13 rotates relative to the cam member 52 causing through the cam teeth, above descirbed on the cam member and side gear 13, axial movement of the cam member 52. The axial movement of the cam member 52 effects a loading of the disc pack 40 and a lockup of the differential.

While the operation of the differential has been described above in connection with differentiating action causing rotation of the cam member 52 in the direction of arrow 79, the differential will equally operate in the same manner when the differentiating action causes rotation of the cam member 52 in a reverse direction of rotation, as should be apparent. Accordingly, such description will not be made in detail.

It should be apparent from the above that applicant has provided a substantially improved actuator mechanism for a locking-type differential. It should be further apparent that the mechanism is extremely simple and reliable and always operating as opposed to a latching-type engagement mechanism. Moreover, it should be apparent that the actuator mechanism is not subject to the problem of engagement, due merely to centrifugal rotation of the case 11. This should be clear in view of the fact that during normal differentiating action or during normal rotation when no differentiating action is occurring, the mass 71, the cam 52, and the side gear 13 are rotating at the same angular speed of rotation, and there is no relative movement between the cam 52 and the weight 71. In addition, it should be clear that the retarding force applied to the cam member 52 is a function of how fast the cam member 52 rotates, since the faster the cam member 52 rotates with respect to the case 11, the faster the mass 70 must oscillate and accelerate. The retarding torque, of course, as discussed above, below a given speed of rotation of the cam 52 is insufficient to retard the cam 52 but the torque above that speed is in excess of that required to retard the cam 52 and it is retarded relative to the side gear 13 to effect the lockup of the locking mechanism 40. Moreover, the retarding torque, as can be shown mathematically, is a function of the square of the speed of the cam member 52, and thus as the cam member 52 increases in speed, the retarding force acting thereon increases as an exponential function.

Figure 5:
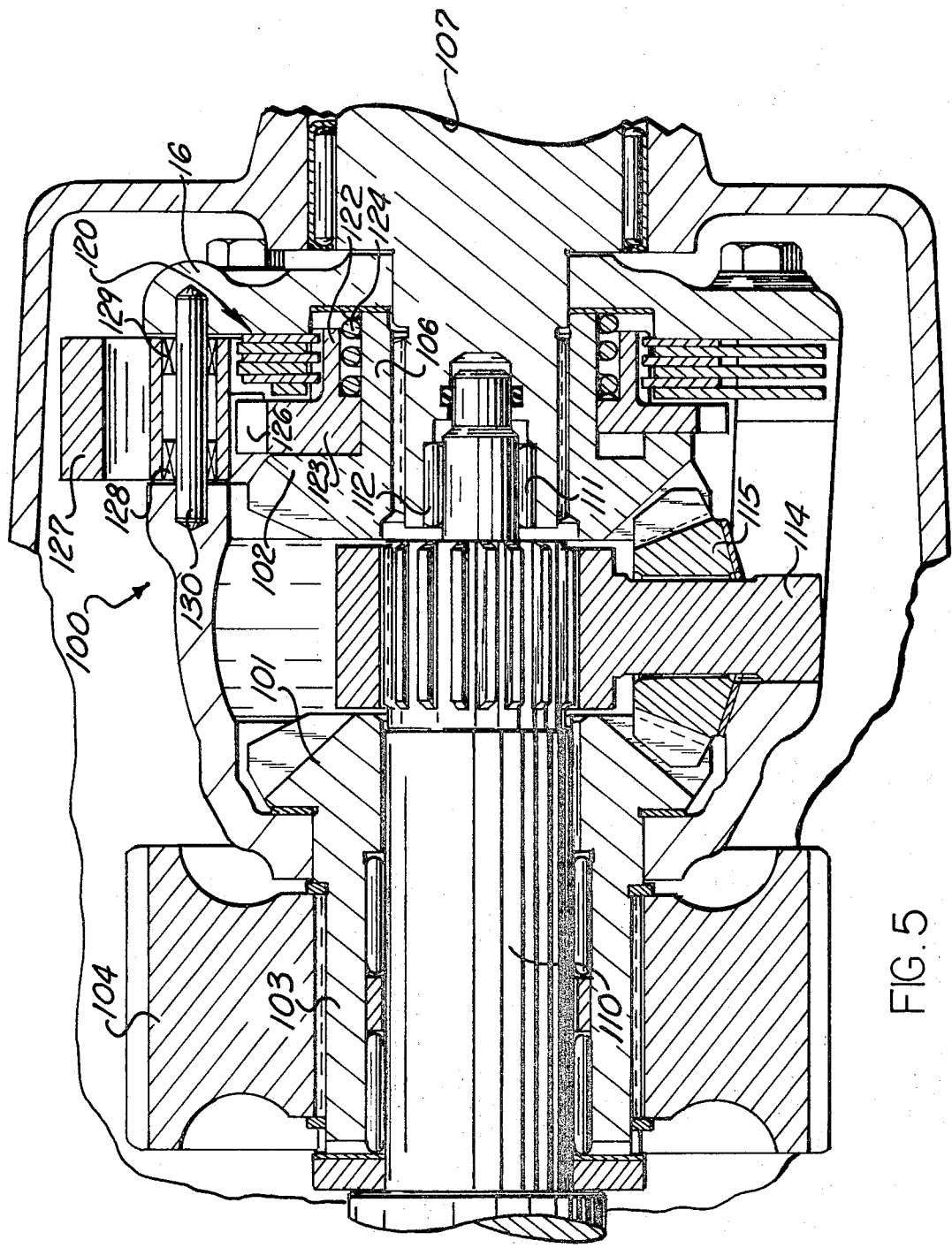
FIG. 5 is a sectional view of a modified embodiment of the present invention.

A modified embodiment of the present invention is illustrated in FIG. 5. This embodiment incorporates many of the features disclosed above and is basically identical with the features of the present invention disclosed and described in connection with FIG. 1, and accordingly the description thereof will be less detailed and made with reference to the operation of the differential disclosed in FIG. 1.

The embodiment of FIG. 5 is designated 100 and is again shown as a differential mechanism which is interaxle. The differential mechanism 100 includes a pair of side gears 101 and 102. The side gear 101 has a hub portion 103 which is splined to a suitable sprocket 104 for driving the front wheels of the vehicle. The side gear 102 has a hub portion 106 which is internally splined to a shaft 107 which extends to the rear wheels of the vehicle to effect driving thereof.

The drive into the differential 100 is by a shaft 110 which extends through the hub portion 103 of the gear 101 and is supported at its inner end in a counterbore 111 in the shaft 107. A suitable bearing 112 is interposed between the shaft 107 and the shaft 110 to support the inner end of the shaft 110 for rotation relative to the shaft 107. Suitably secured to the shaft 110 is a transversely extending stub shaft 114 on which is rotatably mounted pinion gears, one of which is shown at 115. The pinion gear 115 has a meshing engagement with the side gears 101 and 102.

Upon rotation of the shaft 110 from the transmission of the vehicle, drive is transmitted to the stub shaft 114 and to the pinion gear 115. The pinion gear rotates about the axis of the shaft 110 and effects a torque transmission to the side gears 101 and 102 which effect, through their driving connections, the driving of the front and rear wheels of the vehicle, respectively. Of course, when a differentiating action occurs, the pinion 115 rotates relative its axis on the stub shaft 114. The stub shaft 114, of course, is secured in and geared to the case 116 which rotates along with the shaft 110.

The differential 100, of course, is a locking-type differential mechanism and includes a disc pack, as described above in connection with the embodiment of FIG. 1 and which is designated 120. The disc pack 120 functions to lock the side gear 102 to the case 116 of the differential for purposes of locking up the differential. The disc pack 120 is somewhat different in construction from that disclosed above in that it includes a plurality of discs, all of which are keyed to a hub portion 122 of the cam member 123, which cam member 123 is similar in construction and operation to the cam member 52 described above in connection with the embodiment of FIG. 1. The cam member 123 and side gear 102 have cooperating cam surfaces on their mating faces, as described above, and upon relative rotation of the side gear 102 relative to the cam 123, there is an axial shifting of the cam 123 in order to load the disc pack 120 to effectively lock up the differential. Since the discs of the disc pack are all keyed to the cam member 123 when locked up, the locking torque is applied entirely through the cam member 123. The cam member 123, when moved axially, moves in opposition to the bias of a coil spring 124 which encircles the side gear and acts between the case and the cam member 123.

The actuator mechanism for retarding rotation of the cam member 123 is in operation substantially identical to that described above in connection with the embodiments of FIGS. 1–4. However, the actuator mechanism is structurally different in certain respects. In the embodiment shown in FIG. 5, the cam member 123 is provided on its periphery with teeth 126 which cooperate with an oscillating mass 127, in much the same manner as that described above in connection with the embodiment of FIGS. 1–4. The oscillating mass in this embodiment, however, is supported by bearings 128 and 129 which encircle a stub shaft 130 which is fixed in the case 116. The oscillating mass 127 is thereby rotated or rotates relative to the stub shaft 130 on the bearings 128, 129.

It should be apparent that the construction as illustrated in FIG. 5 has all of the structural advantages of that disclosed in the embodiment of FIGS. 1–4.

Also, from the above it should be apparent that applicant has provided a substantially improved differential mechanism of the locking-type and, in particular, has provided a substantially improved actuator mechanism for actuating a lockup mechanism for a differential, and which actuator mechanism is capable of use with a variety of different types of lockup mechanisms to actuate the same and with a variety of different differential constructions.

What is claimed is:

1. A differential gear mechanism comprising a differential gear case defining a gear chamber, differential gear means located in said gear chamber, said differential gear means including at least one input gear and a pair of output gears, lockup means for locking up said differential gear means to retard differentiating action, and actuator means for actuating said lockup means, said lockup means including a member rotatable relative to said actuator means upon differentiating action occurring, and said actuator means including an oscillating weight engageable with said member upon rotation thereof relative to said actuator means to retard rotation thereof, and means for moving said member to actuate said lockup means upon a predetermined degree of retardation of rotation of said member.

2. A differential gear mechanism as defined in claim 1 wherein said lockup means comprises a clutch means for drivingly coupling said gear case and one of said output gears.

3. A differential as defined in claim 1 further including means for mounting said weight on said case and supporting said weight for pivotal movement relative to said case about a pivot axis.

4. A differential gear mechanism as defined in claim 3 wherein said clutch means comprises a disc pack having a plurality of discs which are splined to the case and a plurality of discs which are splined to said one output gear, and said member comprises an axially movable member which is moved axially upon a predetermined degree of rotation thereof relative to said one output gear to load said disc pack.

5. A differential gear mechanism as defined in claim 4 wherein said member comprises a cam member having cam surfaces cooperable with cam surfaces on said one output gear, said cam surfaces having a frictional engagement tending to cause said cam member and said one output gear to rotate as a unit and said retardation retarding said cam member from rotation with said output gear, and said cooperating cam surfaces upon rotation of said one output gear relative to said cam member effecting axial movement of said cam member to effect said loading of said disc pack.

6. A differential gear mechanism as defined in claim 5 wherein said cam member has a hub portion and said disc pack includes a first plurality of discs keyed to said case and a second plurality of discs keyed to said one output gear and to said hub portion of said cam member.

7. A differential gear mechanism as defined in claim 5 wherein said cam member has a hub portion and said disc pack includes a first plurality of discs keyed to said case and a second plurality of discs all of which are keyed to said hub portion of said member.

8. A differential gear mechanism as defined in claim 5 wherein said cam member has a plurality of teeth on the outer periphery thereo, and said oscillating weight comprises a member carried by said case and which has co-operating teeth which project into the path of movement of the teeth on said cam member.

9. A differential gear mechanism as defined in claim 1 wherein said oscillating weight comprises a weight member carried by said case and rotatable therewith, means supporting said weight member for pivoting movement relative to said case, said cam member having surfaces engageable with said weight member to effect oscillation of said weight about its pivot axis upon rotation of said cam member relative to said weight member, the reaction force of said cam member causing said oscillation of said mass retarding rotation of said cam member.

10. A differential gear mechanism as defined in claim 9 wherein said cam member has teeth which project peripherally therefrom and said oscillating weight has co-operating teeth which move into and out of the path of movement of said teeth on said member, said teeth on said cam member having surfaces which engage said teeth on said oscillating weight to effect oscillation thereof.

11. A differential gear mechanism comprising a differential gear case defining a gear chamber, differential gear means located in said gear chamber, said differential gear means including at least one pinion gear carried by and rotatable with said case and a pair of output side gears having a meshing relationship with said pinion gear, a clutch means in the form of a disc pack interposed between one of said side gears and said case and when energized locking said case and said one side gear drivingly together to thereby retard differentiating action, said one side gear having cam surfaces on an axial side thereof, a cam member interposed between said axial side of said gear and said disc pack and having cooperating cam surfaces which engage said cam surfaces on said side gear, said cam surfaces constructed so that upon relative rotation of said cam means and said side gear said cam means is moved axially to effect a loading of said disc pack to thereby lock up said differential, and means for retarding rotation of said cam means with said side gear at a predetermined degree of differentiating action, said means comprising an oscillating weight carried by said case and pivotal relative thereto about a pivot axis, said oscillating weight having a surface intermittently engageable with a surface portion of said cam member, said intermittent engagement causing said cam member to effect oscillation of said weight with the reaction force acting on said cam member tending to retard rotation thereof with said side gear.

12. A differential gear mechanism as defined in claim 8 wherein said cam member has a plurality of teeth on the outer periphery thereof and said oscillating weight has spaced teeth thereon located on opposite sides of said pivot axis, one of said teeth on said cam member effecting when in engagement with one of the teeth on said oscillating weight rotation of said oscillating weight in one direction, another tooth on said cam member being engageable with the other tooth on said weight to effect oscillation of said weight member in the opposite direction.

13. A differential gear mechanism comprising a differential gear case defining a gear chamber, differential gear means located in said gear chamber, said differential gear means including at least one input gear and a pair of output gears, lockup means for locking up said differential gear means to retard differentiating action, and actuator means for actuating said lockup means, said lockup means including a member rotatable relative to said actuator means upon differentiating action occurring, and said actuator means including a weight, means supporting said weight for oscillating movement, said weight having a portion engageable with said member upon rotation thereof relative to said actuator means to effect oscillation of said weight with the reaction force acting on said member to retard rotation thereof, and means for moving said member to actuate said lockup means upon a predetermined degree of retardation of rotation of said member.

* * * * *